United States Patent
Okamura et al.

(10) Patent No.: US 6,880,751 B2
(45) Date of Patent: Apr. 19, 2005

(54) AUTOMATIC TRANSACTION APPARATUS AND METHOD OF ISSUING A COUPON USING THE SAME

(75) Inventors: Sagiri Okamura, Kanagawa (JP); Hisanobu Izumi, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 10/714,606

(22) Filed: Nov. 18, 2003

(65) Prior Publication Data

US 2004/0094618 A1 May 20, 2004

(30) Foreign Application Priority Data

Nov. 18, 2002 (JP) ........................................ 2002-334026

(51) Int. Cl.$^7$ .............................................. G06K 5/10
(52) U.S. Cl. ......................................................... 235/380
(58) Field of Search ................................ 235/375, 380

(56) References Cited

U.S. PATENT DOCUMENTS

2002/0038239 A1 * 3/2002 Hasegawa et al. ............ 705/14
2002/0111864 A1 * 8/2002 Ukai et al. .................... 705/14

OTHER PUBLICATIONS

English Language Abstract Japanese Patent Publication No. 2002–041932 published Feb. 8, 2002.

* cited by examiner

*Primary Examiner*—Mark Tremblay
(74) *Attorney, Agent, or Firm*—Staas & Halsey LLP

(57) ABSTRACT

A method for issuing coupons through an automatic transaction apparatus, which permits consumers to enjoy discounts or other promotional services more widely and conveniently. Coupon descriptors containing various coupon information are stored in association with output medium identifiers. Each output medium identifier specifies at least one of a plurality of recording media (e.g., IC card, paper, portable information equipment) that can be used to store coupon information. When issuing a coupon to a user, the automatic transaction apparatus identifies which recording medium to use as an output medium for the requested coupon, by consulting a relevant output medium identifier. If there are two or more selectable media, the user is prompted to make a selection. The apparatus then outputs the coupon information to the identified or selected recording medium, thereby issuing a coupon to the user.

14 Claims, 18 Drawing Sheets

FIG. 4

151 COUPON INFORMATION DATABASE

| | DESCRIPTION | STORE |
|---|---|---|
| COUPON A | ¢50 DISCOUNT ON EGGS | AA SUPERMARKET |
| COUPON B | DISCOUNT TICKET & FREE GUIDE MAP | BB AMUSEMENT PARK |
| COUPON C | COMMISSIONS 50% OFF | CC SECURITIES CORP |
| COUPON D | FREE CUP OF COFFEE | DD RESTAURANT |
| COUPON E | FREE INVITATION | EE SPA RESORT |

152 COUPON HANDLING TABLE

| | OUTPUT MEDIUM IDENTIFIER | SECURITY CLASS IDENTIFIER | USE CONDITION IDENTIFIER |
|---|---|---|---|
| COUPON A | PAPER | S1 | C1 |
| COUPON B | CELLULAR PHONE | S3 | C4 (GROUP USE) |
| COUPON C | IC CARD | S5 (PAYMENT ≧ $100) | C2 |
| COUPON D | PAPER IC CARD | S4 (GROUP USE) | C1 |
| COUPON E | IC CARD CELLULAR PHONE | S2 | C3 (LOAN ≧ $100) |

FIG. 5

SECURITY CLASS IDENTIFIERS

| IDENTIFIER | IC CARD OR CELLULAR PHONE | PAPER |
|---|---|---|
| S1 | No checks required | No checks required |
| S2 | No checks required | Show IC card |
| S3 | Enter password | Show IC card and enter password |
| S4 | No checks required | Enter password when specified additional condition is true |
| S5 | Enter password when specified additional condition is true | Show IC card and enter password when specified additional condition is true |

FIG. 6

USE CONDITION IDENTIFIERS

| IDENTIFIER | IC CARD AND CELLULAR PHONE | PAPER |
|---|---|---|
| C1 | Unconditionally usable | Unconditionally usable |
| C2 | Usable only in card payment | Usable only in card payment |
| C3 | Issuable only when specified additional condition is true; Usable only in card payment | Issuable only when specified additional condition is true; Unconditionally usable |
| C4 | Test additional condition at the time of use, and then apply:<br>• C2 if the condition is true<br>• C1 if the condition is false | Test additional condition at the time of use, and then apply:<br>• C2 if the condition is true<br>• C1 if the condition is false |

FIG. 7

AA SUPERMARKET

¢ 50 DISCOUNT ON EGGS

Valid on September 10, 2002 only

FIG. 11

BB AMUSEMENT PARK $2 DISCOUNT COUPON

* * * * * * * *

Enter password to receive the discount stated above.

For group use, payment should be made by XX credit card.

FIG. 13

This coupon is valid for payment by XX credit card only.

You will be requested to enter a password when you make a payment of $100 or more with the benefit of this coupon.

AUTOMATIC TRANSACTION APPARATUS AND METHOD OF ISSUING A COUPON USING THE SAME

BACKGROUND OF THE INVENTION (1) Field of the Invention

The present invention relates to a method for issuing coupons, and more particularly to a method for issuing coupons through an automatic transaction apparatus that performs predetermined transactions interactively with a user.

(2) Description of the Related Art

A variety of discount coupons are offered today for promotional purposes. Usually they are made available in the form of printed paper produced by a ticket issuing machine and given out to consumers for use at particular stores. People, however, feel inconvenient to carry many paper coupons with them. Also, they often forget where they put those coupons.

These days, an increasing number of consumers enjoy electronic money transactions using IC cards or similar portable data storage devices for payment at stores. This trend has led to a proposal of electronic coupons for use with IC cards and automatic transaction machines. More specifically, the user receives coupon information by inserting his/her IC card into an automatic transaction machine located at a store. When shopping, the user presents his/her IC card at the cash desk. A salesclerk then confirms the coupon information recorded in the IC card before providing the customer with a discount or other beneficial services.

Also proposed is another type of IC card-based coupon system. This system delivers coupons to users, together with product advertisements. An advertisement server is employed to offer product information services to subscribers who have made registration by sending their personal information, such as gender and occupation, to the server. Based on the data about individual subscribers, the advertisement server selects appropriate pieces of product information from among those stored in a database. It also selects suitable coupon information at the same time, thus compiling a personalized set of advertisements and discount coupons for delivery to the intended subscriber. The subscriber chooses some of the received advertisements and coupons as needed, and stores them in his/her own IC card, together with his/her personal information. When a coupon is used at a store, the cardholder's personal information is transferred from the card reader in that store to the sponsor company that issued the coupon. The company uses this information to update their customer database and membership database for future marketing purposes. For more details about the system, refer to the Unexamined Japanese Patent Publication No. 2002-41932.

Recently many stores have an automated teller machine (ATM). People can make access to their deposit account at nearby convenience stores, for example. From a marketing viewpoint, those ATMs and other similar automatic transaction machines are quite attractive as a new advertising medium since they are used by a large number of potential customers every day. Those machines would serve well for sponsors and consumers if they have the functions of both advertising and issuing coupons.

While the use of IC cards for storing coupons is an excellent idea, the problem at the moment is that not every store has an IC card reader for the above-described electronic coupon service. People are unable to enjoy discounts or other promotional service offerings if there is no suitable card reader equipment in the stores.

SUMMARY OF THE INVENTION

The present invention was made under the background circumstances described above. An object of the present invention is to provide a method for issuing coupons through an automatic transaction apparatus, which permits consumers to enjoy discounts or other promotional services more widely and conveniently.

Another object of the present invention is to provide automatic transaction apparatus which issues coupons to consumers, enabling them to enjoy discounts or other promotional services more widely and conveniently.

In order to achieve the above first object, the present invention provides a method for issuing a coupon through an automatic transaction apparatus that performs a predetermined transaction interactively with a user. This method comprises the following steps: (a) storing coupon descriptors and output medium identifiers in an associative manner, the coupon descriptors each containing different coupon information, the output medium identifiers each specifying at least one of a plurality of recording media used for coupons; (b) selecting one of the coupon descriptors as instructed by the user; (c) identifying which recording medium to use as an output medium for the selected coupon descriptor, by consulting the output medium identifier associated with the selected coupon descriptor; and (d) outputting the coupon information in the selected coupon descriptor to the identified recording medium, thereby issuing a coupon to the user.

Furthermore, in order to achieve the above second object, the present invention provides an automatic transaction apparatus that performs a predetermined transaction interactively with a user. This automatic transaction apparatus comprises the following elements: (a) a data storage unit that stores coupon descriptors and output medium identifiers in an associative manner, the coupon descriptors each containing different coupon information, the output medium identifiers each specifying at least one of a plurality of recording media used for coupons; (b) one or more data output units each being responsible for a particular recording medium in outputting specified coupon information thereto for use by the user; and (c) an output control unit that identifies which recording medium to use as an output medium by consulting the output medium identifier associated with one of the coupon descriptors that is selected, determines which output data unit is responsible for the identified recording medium, and commands the determined data output unit to output the coupon information of the selected coupon descriptor.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows an example of the data structure of a coupon information database.

FIG. 5 shows an example of the data structure of a coupon handling table.

FIG. 6 shows security checks specified by security class identifiers.

FIG. 7 shows conditions for use of coupons which are specified by use condition identifiers.

FIG. 11 shows an example of a coupon printed on a piece of paper.

FIG. 13 shows an example screen that appears on a display of a cellular phone when a coupon is written in its memory.

FIG. 15 shows an example of a warning message that appears on a monitor when coupon information is loaded to an IC card.

DESCRIPTION OF THE PREFERRED EMBODIMENT

An embodiment of the present invention will now be described with reference to the drawings.

Figure 1:
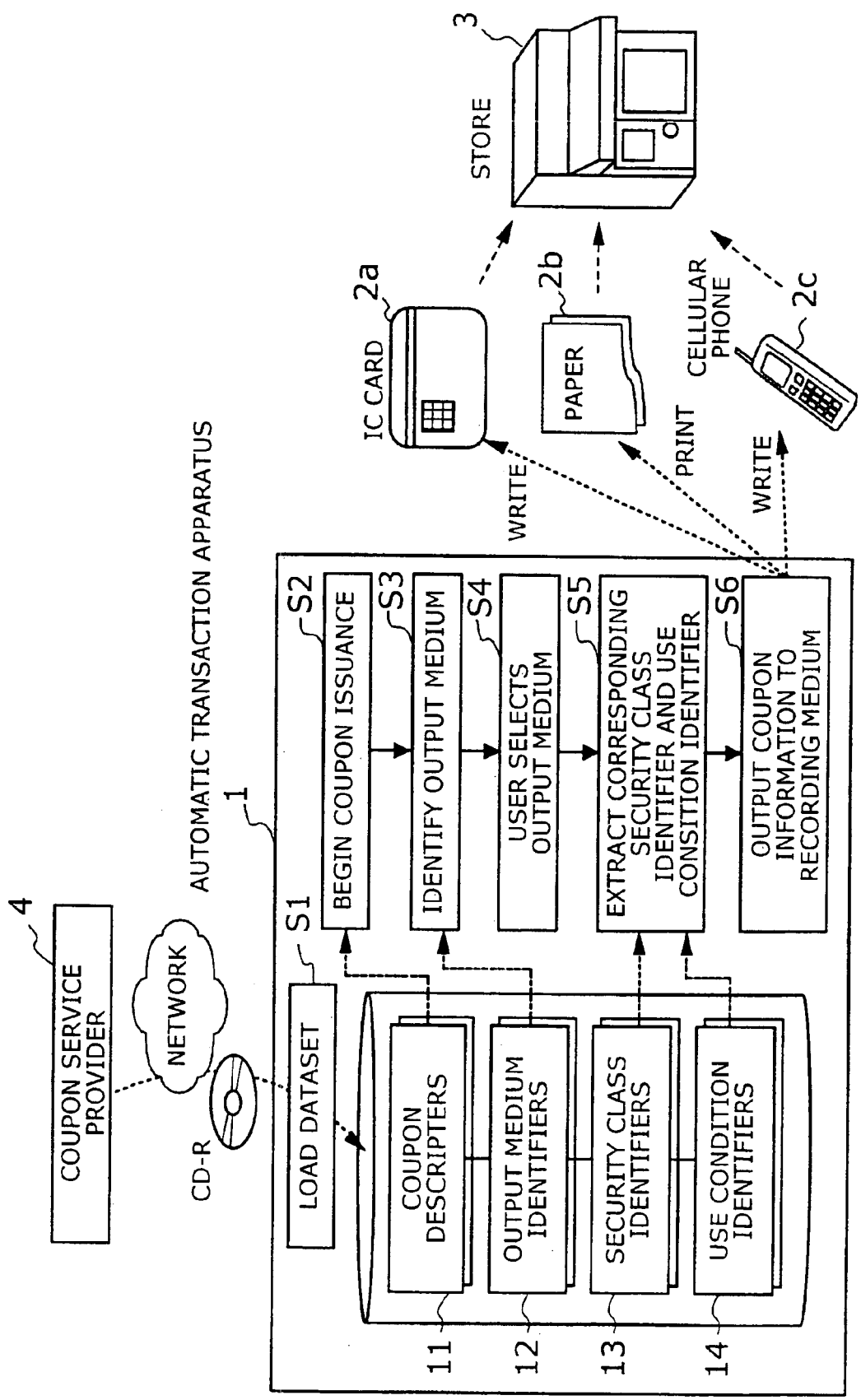
FIG. 1 shows the principles underlying the present invention.

FIG. 1 shows the principles underlying the present invention. In the system of FIG. 1, an automatic transaction apparatus 1 is used to perform a predetermined transaction interactively with a user. Such transactions include depositing, withdrawing and borrowing cash, transferring money, paying bills, and receiving coupons. For example, the automatic transaction apparatus 1 reads the user's identification data from a transaction medium (e.g., IC card) that he/she carries with him/her. It communicates online with host computers (not shown) operated by banks, credit card companies, ticket sales companies, and other various financial institutions. By doing so, the automatic transaction apparatus 1 automatically performs the transactions mentioned above.

The automatic transaction apparatus 1 allows two or more kinds of recording media to be used as the destination of coupon information that is issued. In the example of FIG. 1, it is assumed that IC cards 2a, paper 2b, and cellular phones 2c are available recording media for coupons. Note that the cellular phone 2c is shown here as an example of portable information equipment. Other devices in this category, such as personal digital assistants (PDA), may take the place of the cellular phone 2c.

The IC card 2a is a plastic card with an embedded LSI chip containing a central processing unit (CPU) and a semiconductor memory. The cellular phone 2c has an internal memory, a part of which can be used to record some data supplied from an external source.

Which recording media to use depends on what kind of coupons to offer. The relationships between coupons and their preferable output media are determined and recorded beforehand. With a valid coupon written in an appropriate medium, the user can receive a benefit corresponding to the stored coupon at a predetermined store 3.

The following is an example case where a coupon is issued to a user after a predetermined transaction is performed.

A coupon service provider 4 is a company that provides a coupon data delivery service. This coupon service provider 4 prepares and delivers in advance a set of coupon descriptors 11 to the automatic transaction apparatus 1 for entry in its local database. At this time the coupon service provider 4 also delivers output medium identifiers 12. The automatic transaction apparatus 1 stores the received output medium identifiers 12 together with the coupon descriptors 11 in an associative manner. Additionally, the coupon service provider 4 may provide security class identifiers 13 and/or use condition identifiers 14 to the automatic transaction apparatus 1. Those security class identifiers 13 and use condition identifiers 14 are also stored in association with the coupon descriptors 11.

Output medium identifiers 12 are used to specify which recording medium is suitable for outputting each particular coupon. Note that a plurality of suitable recording media can be specified as output medium for a single coupon. While different stores may have different preferences about media, an adequate selection of output medium identifiers 12 enables the use of a most suitable recording medium at each different store. For example, even if the store 3 has neither a card reader for IC cards 2a nor an interface for cellular phones 2c, there is still a paper medium 2b as the output medium. This feature of the present invention will increase the usability of coupons.

Security class identifiers 13 specify what security checks are needed to ensure that the bearer of a coupon is an entitled user of that coupon. Security checks include password protection that requires the bearer to enter a predetermined password correctly when he/she uses his/her coupon.

Use condition identifiers 14 specify the conditions for use of coupons at the specified store 3. They also specify the conditions for issuance of coupons in some cases. The criteria include, for example, the purchase price and payment method in a shopping transaction.

The process performed by the automatic transaction apparatus 1 when issuing a coupon will now be described below in the order of steps.

In step S1, the coupon descriptors 11 (the source of coupons to be issued to users) and corresponding output medium identifiers 12 are loaded beforehand from the coupon service provider 4 to the automatic transaction apparatus 1. Such a dataset is sent as needed, or at regular intervals, from a host computer in the coupon service provider 4 via a network and loaded in a data storage device in the automatic transaction apparatus 1. Another possible method of data delivery is to use a portable digital data storage medium, such as a compact disc-recordable (CD-R) or other optical discs. In this case, it is an operator's task to load a given dataset into the automatic transaction apparatus 1.

In step S2, a coupon issuing process begins. In many cases, coupons are offered to users as additional service after they have performed a predetermined transaction, such as depositing, withdrawing or borrowing cash, using the automatic transaction apparatus. The following steps S3 through S5 will be executed either upon completion of a transaction, or during idle periods such as "wait I/O" time in the course of a transaction.

In step S3, the user selects a desired coupon, which allows the automatic transaction apparatus 1 to retrieve a corresponding coupon descriptor 11, as well as its associated output medium identifier 12. If the retrieved output medium identifier 12 suggests a plurality recording media, then, in step S4, the user is prompted to select a desired medium from among those listed on a monitor screen. The selection made by the user finalizes which recording medium to use for the coupon.

In step S5, if there are a security class identifier 13 and use condition identifier 14 corresponding to the coupon descriptor 11, then they are extracted.

In step S6, the coupon information (i.e., the content of the selected coupon descriptor 11) is output to the recording medium determined in step S3 or S4. The corresponding security class identifier 13 and use condition identifier 14, if any, will accompany the coupon information. The actual form of coupon information depends on what medium is used. If the case of IC card and cellular phone versions, the coupon and its accompanying information will be recorded in digital form. In the case of paper version, they will be printed on a piece of paper.

The user visits the store 3, carrying the recording medium containing a coupon so as to receive a service to which the coupon entitles him/her. Suppose now that a coupon is recorded in his/her cellular phone 2c (though the same applies for IC card version of coupons). When making a payment in the store 3, the user attaches his/her cellular phone 2c to a terminal installed there to read out the data recorded in it. The coupon information read out of the cellular phone 2c enables him/her to receive a service. If a security class identifier 13 is also found there, then a security check corresponding to that identifier 13 is executed. Likewise, if a use condition identifier 14 is found, the corresponding condition is tested. Those optional tasks are executed automatically through the above-mentioned terminal in the store 3.

In the case of a paper coupon, the user shows it to a salesperson at the store 3 to receive the intended service. If a statement concerning security measures is printed on the paper coupon, the salesperson verifies the qualification of the user according to that statement. If there is also a statement about use conditions,, then the salesperson determines whether the stated use condition is satisfied.

As stated above, according to the present invention, an output medium identifier 12 is associated with each coupon descriptor 11. When a particular coupon descriptor 11 is selected for issuance, the corresponding output medium identifier 12 specifies a recording medium for that coupon information. Actually, output medium identifiers 12 are defined such that they specify an adequate output medium that will certainly be accepted at each intended destination (e.g., stores, restaurants). This means that output medium identifiers 12 ensure that the user can receive a service when he/she visits the store 3, thus contributing to the provision of more expanded coupon issuance services. If there are two or more possible output media for a particular coupon, the user can select the one that is most convenient to him/her.

When a security check is needed to prevent a coupon from illicit use by an unqualified person, the present invention allows the coupon service provider 4 to use security class identifiers 13 to specify what kind of process to perform to ensure the security for each different coupon. In addition, a use condition identifier 14 may be specified for each coupon descriptor 11. This feature of the present invention gives more flexibility to the coupon service provider 4 in designing coupons, which requires careful consideration of profitability and advertising effectiveness, and so on.

An embodiment of the present invention will now be described concretely, assuming a system with automated teller machines (ATMs) that serve as automatic transaction apparatus for consumers to use a cash advance loan service from a credit card company. In this system, ATMs have a function of issuing a coupon in a specified recording medium. The system also supports security checks that may be required at the time of using a coupon, as well as conditions for use or issuance of coupons. Those parameters can be specified for each different recording medium used.

Figure 2:
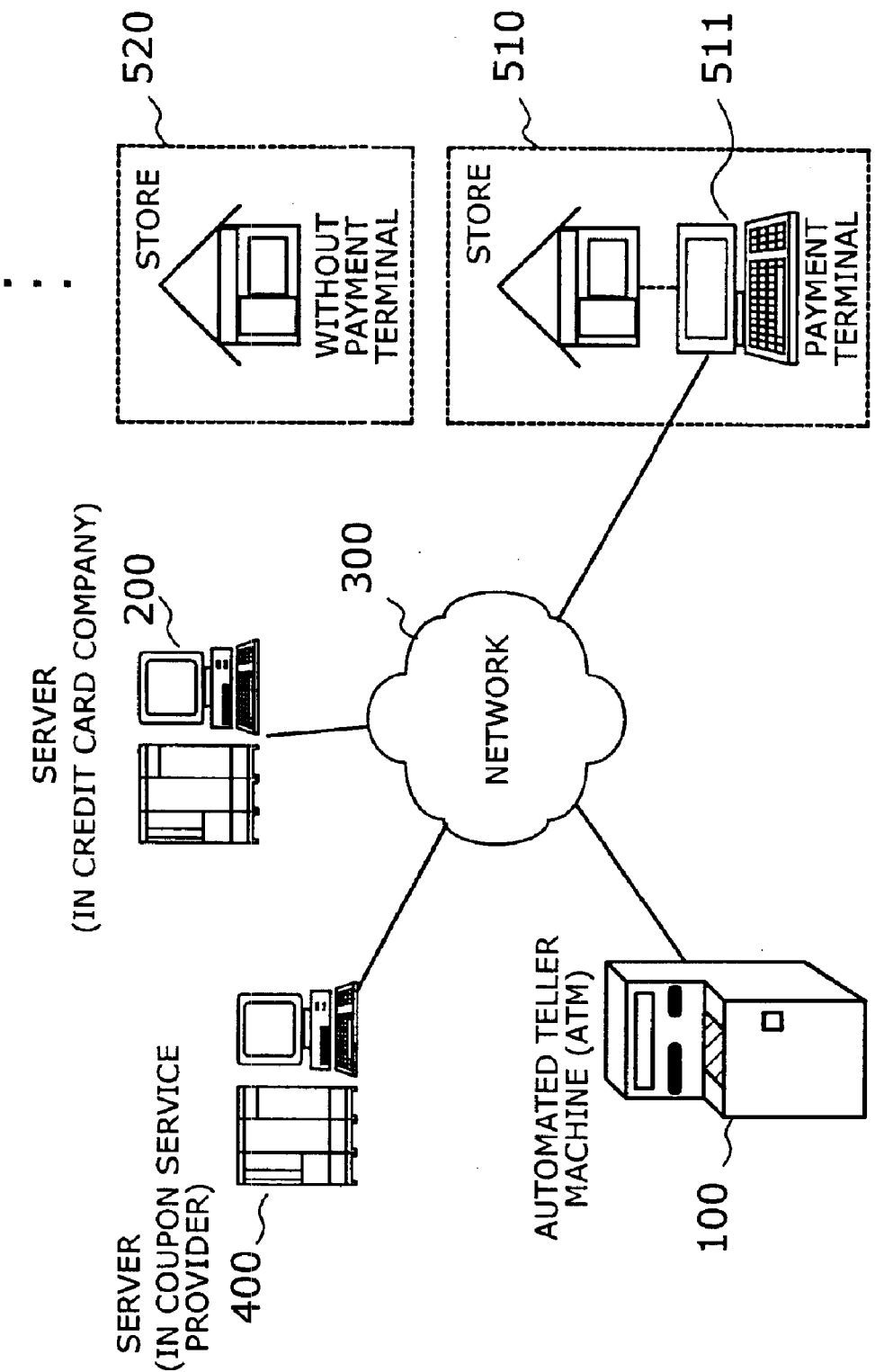
FIG. 2 shows an example of the system structure according to an embodiment of the present invention.

FIG. 2 shows an example system structure according to an embodiment of the present invention. It is supposed that a user interacts with an ATM 100 to borrow a certain amount of money by using a cash advance service from a credit card company. Here, the ATM 100 not only processes loan transactions, but also issues a coupon when such transactions are finished. The user uses his/her a credit card as a transaction medium in this loan transaction, which is an IC card with a magnetic stripe where the information for identifying himself/herself and other data used by the credit card company are recorded. The IC card also has a storage area in its embedded semiconductor memory to store additional information including coupon information.

As shown in FIG. 2, the ATM 100 is connected to a server 200 installed in the credit card company via a network 300. The amount of the loan that the user wishes is sent from the ATM 100 to the credit card company server 200, together with his/her identification data. The response to this loan request is sent back from the server 200 to the originating ATM 100. The network 300 is, for example, a leased line or a secure connection over the Internet.

The ATM 100 has the function of issuing a coupon before loan handling is completed. The coupon service provider 4 employs a server 400 for generating and delivering a set of coupon descriptors, the source data of coupons. The server 400 is connected to the network 300 and delivers coupon descriptors directly to the ATM 100, or indirectly via the credit card company server 200. Or alternatively, coupon descriptors may be delivered offline to the ATM 100, being recorded in a portable data storage medium, such as CD-R, at the coupon service provider's site.

The issued coupon is used at, for example, a store 510 or at another store 520. The store 510 has an online payment terminal 511 connected to the network 300. The payment terminal 511 is used in, among others, a credit card payment process, in which it reads data recorded in a memory area of an IC card (or a cellular phone with credit card functions) and communicates with the server 200 in the credit card company. If this data includes a coupon, then the payment terminal 511 provides the bearer with a specified benefit, such as a discount on the purchase.

It is assumed, on the other hand, that the second store 520 has no such payment terminal; they only accept paper coupons. At this store 520, customers cannot receive benefits of coupons unless they present coupon information printed on paper.

While FIG. 2 shows the system in a simplified way, there are actually a large number of ATMs 100 and stores 510 and 520. What is shown as the coupon service provider server 400 in FIG. 2 may be installed in individual stores, businesses, or wherever coupons will be used. Modifications may occur to the network structure, too. For example, the network between the payment terminal 511 and server 200 may be separate from the one between the ATM 100 and server 200.

Figure 3:
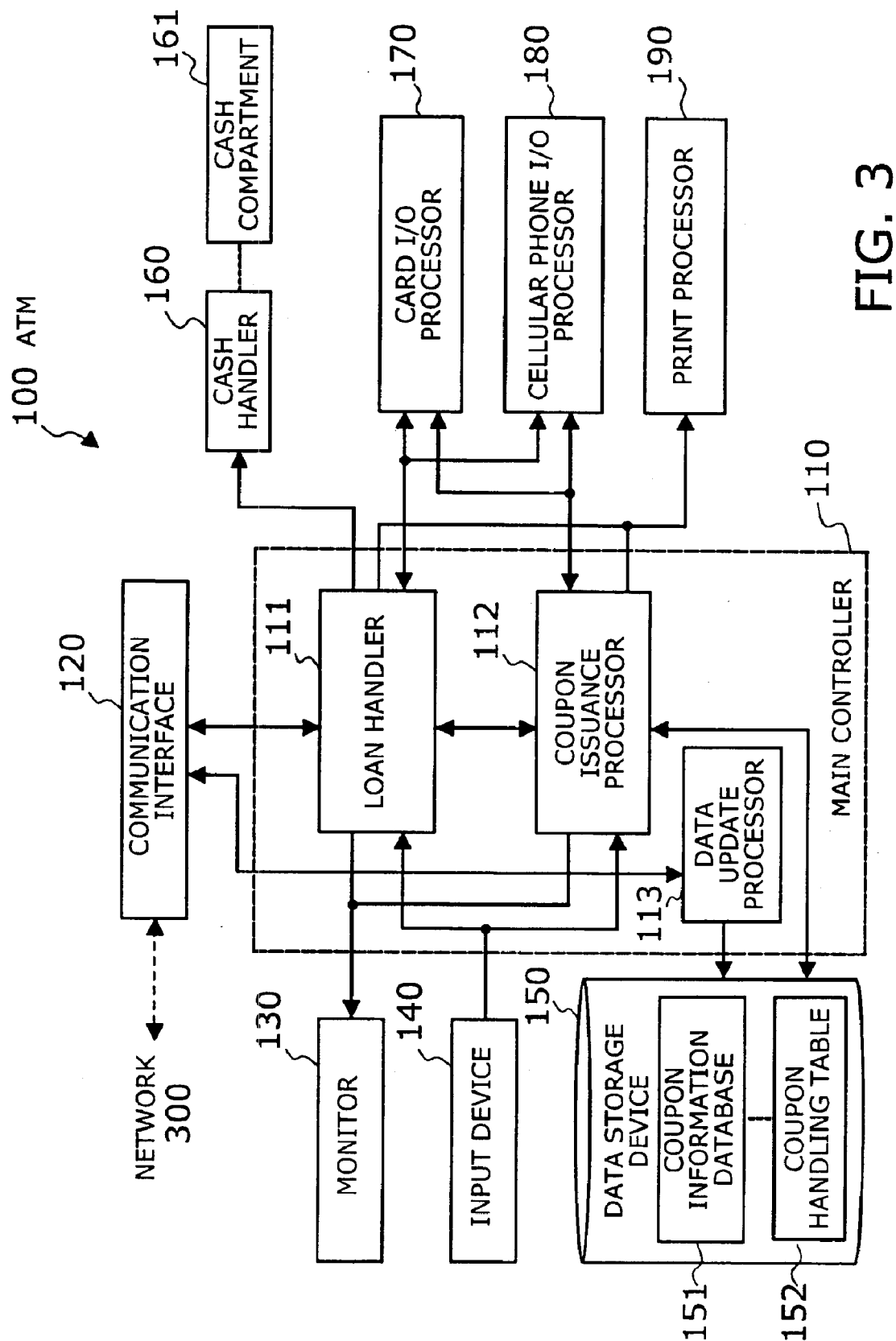
FIG. 3 is a block diagram of an automated teller machine according to the present invention.

FIG. 3 is a block diagram showing the structure of the ATM 100 according to the present invention. The ATM 100 has, among others, the following components: a main controller 110, a communication interface 120, a monitor 130, an input device 140, a data storage device 150, a cash handler 160, a card input/output (I/O) processor 170, a cellular phone I/O processor 180, and a print processor 190. Further, a cash compartment 161 is coupled to the cash handler 160.

The main controller 110 has, among others, a loan handler 111, a coupon issuance processor 112, and a data update processor 113. According to interaction with a user through the input device 140, the loan handler 111 communicates with the server 200 in the credit card company via the communication interface 120 and controls the process of dispensing the requested amount of banknotes. The coupon issuance processor 112 performs a coupon issuance process by referring to the dataset stored in the data storage device 150, when the loan handling process is completed. The data update processor 113 communicates with the server 400 in the coupon service provider via the communication interface 120. It downloads data including a new set of coupon descriptors to update the content of the data storage device 150. Usually this update occurs on a regular basis.

The monitor 130 displays information regarding loan handling and coupon issuance processes in accordance with data supplied from the loan handler 111 and coupon issuance processor 112, respectively. The input device 140 accepts inputs from the user and sends them to the loan handler 111 and coupon issuance processor 112. The monitor 130 and input device 140 are actually implemented in the form of an integrated module such as a touch panel-equipped liquid crystal display (LCD).

The data storage device 150 is constructed with, for example, semiconductor random access memory (RAM) devices and hard disk drives (HDD), which provide physical storage space for a coupon information database 151, a coupon handling table 152, and others. The coupon information database 151 stores a plurality of coupon descriptors each containing coupon information available to consumers. The coupon handling table 152 stores the following parameters for each particular coupon: output medium identifier (specifying which recording medium or media can be used to store the coupon information), security class identifier (specifying what security checks should be performed to verify the bearer's authenticity, and use condition identifier (specifying what conditions the user should satisfy to receive a specified service). Those descriptors and parameters of coupons are updated by the data update processor 113 on a regular basis, so that the coupon issuance processor 112 can always use the latest information.

The cash handler 160 dispenses the requested amount of banknotes from the cash compartment 161 to an outlet (not shown) in accordance with instructions from the loan handler 111.

The card I/O processor 170 performs a process of writing data to or reading data from an IC card inserted through a card slot (not shown) of the ATM 100 in accordance with instructions from the loan handler 111 and the coupon issuance processor 112. To be concrete, the card I/O processor 170 has the function of reading data from the magnetic stripe of an IC card, as well as writing and reading data to/from its embedded semiconductor memory.

The cellular phone I/O processor 180 has, for example, a non-contact reader/writer (not shown) to communicate with cellular phones. According to the instructions supplied from the loan handler 111 and coupon issuance processor 112, the cellular phone I/O processor 180 writes and reads data to/from an internal memory of a cellular phone that is attached to the non-contact reader/writer.

The print processor 190 prints a statement describing particulars about a loan transaction, coupon information, or the like on a piece of paper. The printed paper is discharged through, for example, the card slot, in accordance with instructions from the loan handler 111 or coupon issuance processor 112.

FIG. 4 shows an example data structure of the coupon information database 151. The coupon information database 151 stores a complete set of service offerings which a user will be able to receive by presenting appropriate coupons. In this example of FIG. 4, the coupon information database 151 stores five coupon entries, which are identified by their respective names: "coupon A," "coupon B," "coupon C," "coupon D," and "coupon E." In addition, each entry has a field showing the name of a store where users can receive service described in a coupon. For example, the top-most coupon descriptor "coupon A" in FIG. 4 indicates that people can receive a discount of 50 cents when they buy a pack of eggs at the store named "AA Supermarket".

FIG. 5 shows an example data structure of the coupon handling table 152. The coupon handling table 152 stores output medium identifiers, security class identifiers, and use condition identifiers each associated with a particular coupon descriptor stored in the coupon information database 151.

The output medium identifiers each specify at least one recording medium for the corresponding coupon. In the present embodiment, the following three kinds of recording media can be specified as output media: IC cards, cellular phones, and paper. As stated, one or more of these medium types are specified by the output medium identifier that is associated with each coupon descriptor.

The coupon service provider determines output medium identifiers by evaluating each recording medium in terms of, for example, whether it can be used at the intended stores, or whether it is easy to handle when using a coupon contained in it. Referring back to the system of FIG. 2, the first store 510 accepts any of the three recording media because it has a payment terminal 511 with an interface for IC cards and cellular phones, whereas the second store 520 can only accept paper coupons since no suitable payment terminal is available there. When determining output medium identifiers, the coupon service provider 4 takes such a difference between stores 510 and 520 into consideration, thus ensuring that every coupon will be output to the right medium for use in the intended store.

Generally, paper coupons are preferable for small discounts. Also, IC card-based payments are not so popular in some categories of businesses. In those cases, paper is the preferred choice for the medium of coupons. Some coupon service providers may wish to record the history of coupon usage in the recording medium for later use in their marketing activities. In this case, IC card will be specified as the output medium.

Security class identifiers are used to specify what security check is needed to authenticate the person who has a coupon. The coupon handling table 152 of FIG. 5 shows five different security class identifiers S1 through S5. Additional conditions are specified in two coupons coupon C and coupon D. The security test of such coupons takes place only when their respective conditions are met. More specifically, coupon C requires a security check of class S5 only when the amount of payment is larger than or equal to 100 dollars. With coupon D, a class-S4 security check is needed when the coupon is used by a group of users (i.e., two or more persons). As will be described later, such a condition can be added only to security class identifiers S4 and S5.

The use condition identifiers specify the conditions for use of coupons at stores 510 and 520, or the conditions for issuance of coupons. In the coupon handling table 152 of FIG. 5 shows four different use condition identifiers C1 through C4. Further, additional conditions are attached to two identifiers C3 and C4, meaning that the use conditions C3 and C4 are applied only when the corresponding conditions are met. More specifically, the use condition C4 of "coupon B" will be applied when a group of people pay the entrance fee of "BB amusement park" with a discount stated in the coupon B. The use condition C3 of "coupon E" specifies the issuance condition; i.e., the coupon E can be issued only if the amount borrowed is larger than or equal to 100 dollars.

The following provides more specific examples of security class identifiers and use condition identifiers. FIG. 6 shows specific definitions of security class identifiers S1 through S5, in which different sets of security checks are specified depending on which recording medium is used. In this embodiment, two security checking methods are used. One method is to request the user to input a password to authenticate the identity of himself/herself. The other method is to request the user to show his/her IC card to a salesperson at a store. This IC card must be the one used at the issuance of the coupon. When a card is presented together with a paper coupon, the salesperson visually verifies, for example, a membership ID number printed on the coupon by comparing it with that on the IC card.

According to the security check policy shown in FIG. 6, the coupons stored in an IC card or cellular phone would require password entry in some cases (S3 and S5), but no security checks in the other cases (S1, S2, S4). With security class S3, the user is always prompted to enter a password. With security class S5, on the other hand, password entry is only required when the additional condition shown in the security class identifier field in the coupon handling table 152 is true. See the coupon C in FIG. 5, for example. The additional condition specified in this coupon requires the user to enter a password only if the amount paid at the store 510 is larger than or equal to 100 dollars.

In the case of paper coupons, security class S1 request no security checks. Security class S2 requires the user to present his/her IC card for verification of membership ID number. Security class S3 requires the user to enter a password, in addition to showing his/her IC card.

Security classes S4 and S5 permit an additional condition to determine whether a security check is necessary or not. When using a coupon with a security class identifier S4, the user would be prompted to enter a password only if the specified additional condition is met. Both IC card and password may be required when the coupon is of security class S5, but this only occurs if the specified additional condition is true. See the coupon D in FIG. 5, for example. Since the security class identifier of this coupon is S4, password entry will be required if the user is not an individual, but a group of people.

Such a security class identifier is extracted from the coupon handling table 152 when the ATM 100 issues a coupon and is output to a specified recording medium, along with the relevant coupon information. When using a coupon at a store, the bearer is subjected to a specified security check. By specifying an appropriate security class identifier to each coupon based on the price of the intended product or service, reasonable security measures can be taken.

FIG. 7 shows specific definitions of use condition identifiers. In this FIG. 7, four kinds of conditions C1 through C4 are shown. As in the security class identifiers shown in FIG. 6, the use condition identifiers give different sets of conditions, depending on which recording medium is used. The present embodiment assumes that the use of coupons are restricted in credit card payment with IC cards.

In FIG. 7, the topmost use condition C1 imposes no particular restrictions; that is, any payment method is allowed. The second use condition C2 requires the user to pay with a credit card, no matter what recording medium is used for coupons. The third and fourth use conditions C3 and C4 permit an additional condition to accompany the identifiers. Such additional conditions may restrict the issuance of coupons or the use of coupons. Particularly, when the condition C3 is specified, its accompanying additional condition determines in what cases consumers are awarded a coupon. The issued coupon can be used unconditionally in the case of paper version, whereas it is restricted to credit card payment in the case of IC card or cellular phone version. Take coupon E in FIG. 5, for example. As seen, this coupon E has a use condition identifier C3, and its output medium identifier specifies that the coupon information be output to an IC card or a cellular phone. Its associated additional condition imposes a restriction such that a coupon E is offered to those who have received a loan of 1,000 dollars or more.

Referring again to FIG. 7, the bottommost use condition identifier C4 applies the same condition to both groups of recording media. That is, an additional condition is tested when the coupon is used. If the condition is met, then use condition C2 will be imposed. If the condition is not met, then use condition C1 will apply. Referring back to FIG. 5 again, the coupon B has a use condition identifier C4 and an additional condition that states "Group use." Therefore, individual customers can use a coupon B without any restriction (i.e., use condition C2), whereas group customers can use it only in their credit card payment (i.e., use condition C1).

The above-described various use conditions are tested at each store. For IC card or cellular phone version of coupons, the payment terminal 511 in the store 510 (FIG. 2) automatically tests the conditions. In the store 520 with no payment terminal, a salesperson reads the coupon statement and determines whether the printed use condition is satisfied.

Figure 8:
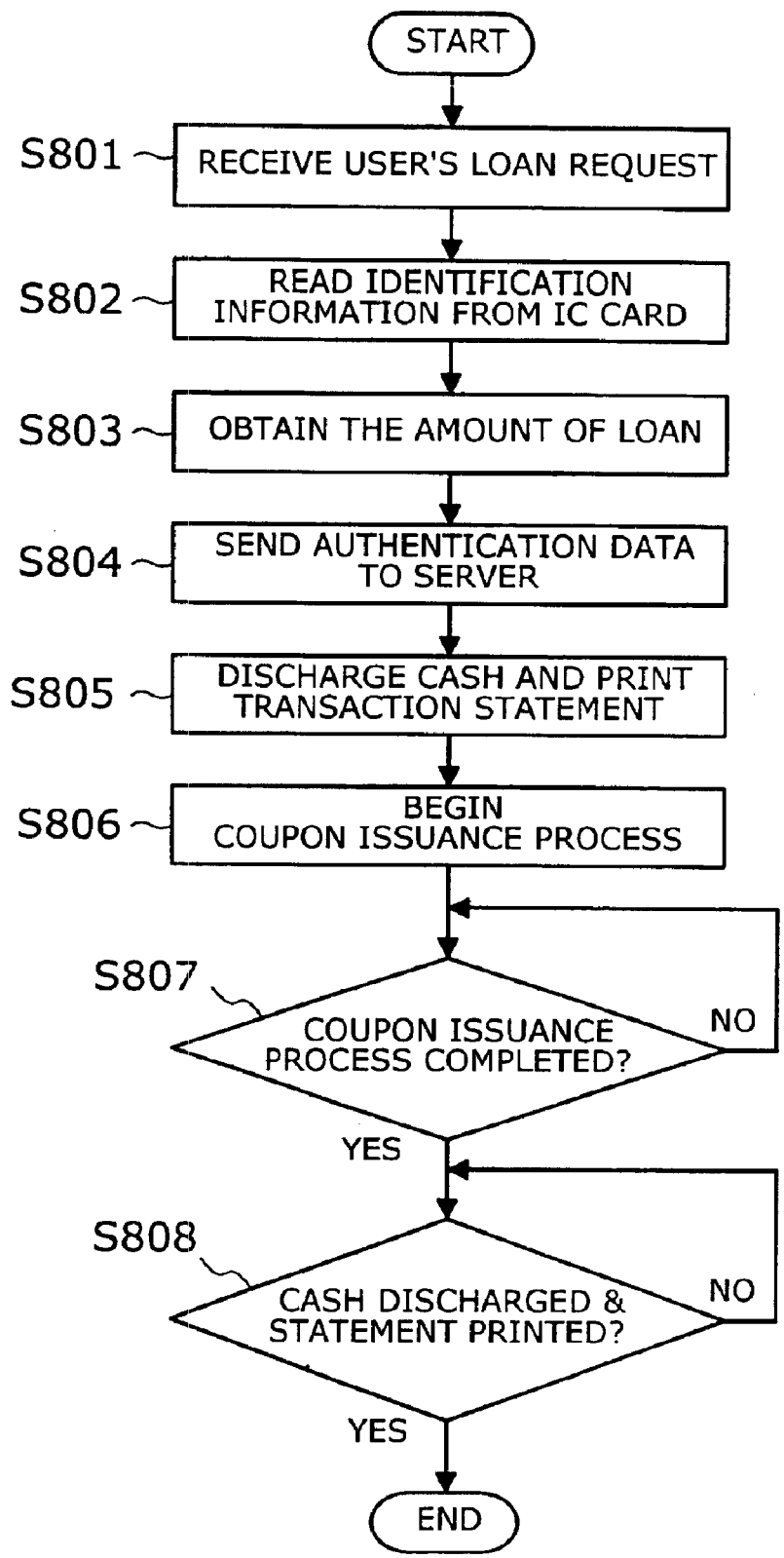
FIG. 8 is a flow chart of a process performed by a loan handler when processing a request from a user who wishes to borrow cash.

FIG. 8 is a flow chart of a process performed by the loan handler 111 when it has received a request from a user who wishes to borrow cash. This process goes as follows:

In step S801, a user makes a request to borrow cash through the input device 140. The request is passed to the loan handler 111.

In step S802, the user inserts his/her IC card into the card slot of the machine. The card I/O 170 processor then reads out various pieces of information for identifying the user from the magnetic stripe or IC chip of the IC card, and the loan handler 111 obtains this identification information.

In step S803, the user inputs how much cash he/she needs, by operating the input device 140, and this information is passed to the loan handler 111.

In step S804, the loan handler 111 sends the user identification data, the amount of the requested loan, and other information to the server 200 in the credit card company. When the server 200 receives the request to borrow cash at the ATM 100, the server 200 performs user authentication and other related tasks on the basis of the user's identification data, and informs the ATM 100 about the results of the process. If this authentication process is finished successfully, then the loan handler 111 will proceed to step S805. If the user's request is not accepted, then the loan handler 111 will terminate the process.

In step S805, the loan handler 111 commands the cash handler 160 to discharge the requested amount of cash from the cash compartment 161. In addition, the loan handler 111 instructs the print processor 190 to print particulars about the loan transaction on receipt paper.

In step S806, the loan handler 111 requests the coupon issuance processor 112 to begin a coupon issuance process. The coupon issuance processor 112 performs this process during the time when the user is waiting for the money and transaction statement to come out of the machine.

In step S807, the loan handler 111 waits for completion notification of the coupon issuance process. When this notification is received from the coupon issuance processor 112, the loan handler 111 proceeds to step S808.

In step S808, the loan handler 111 waits until the requested cash is discharged and a transaction statement is printed out. When the completion is indicated by the cash handler 160 and print processor 190, the loan handler 111 terminates the process.

Figure 9:
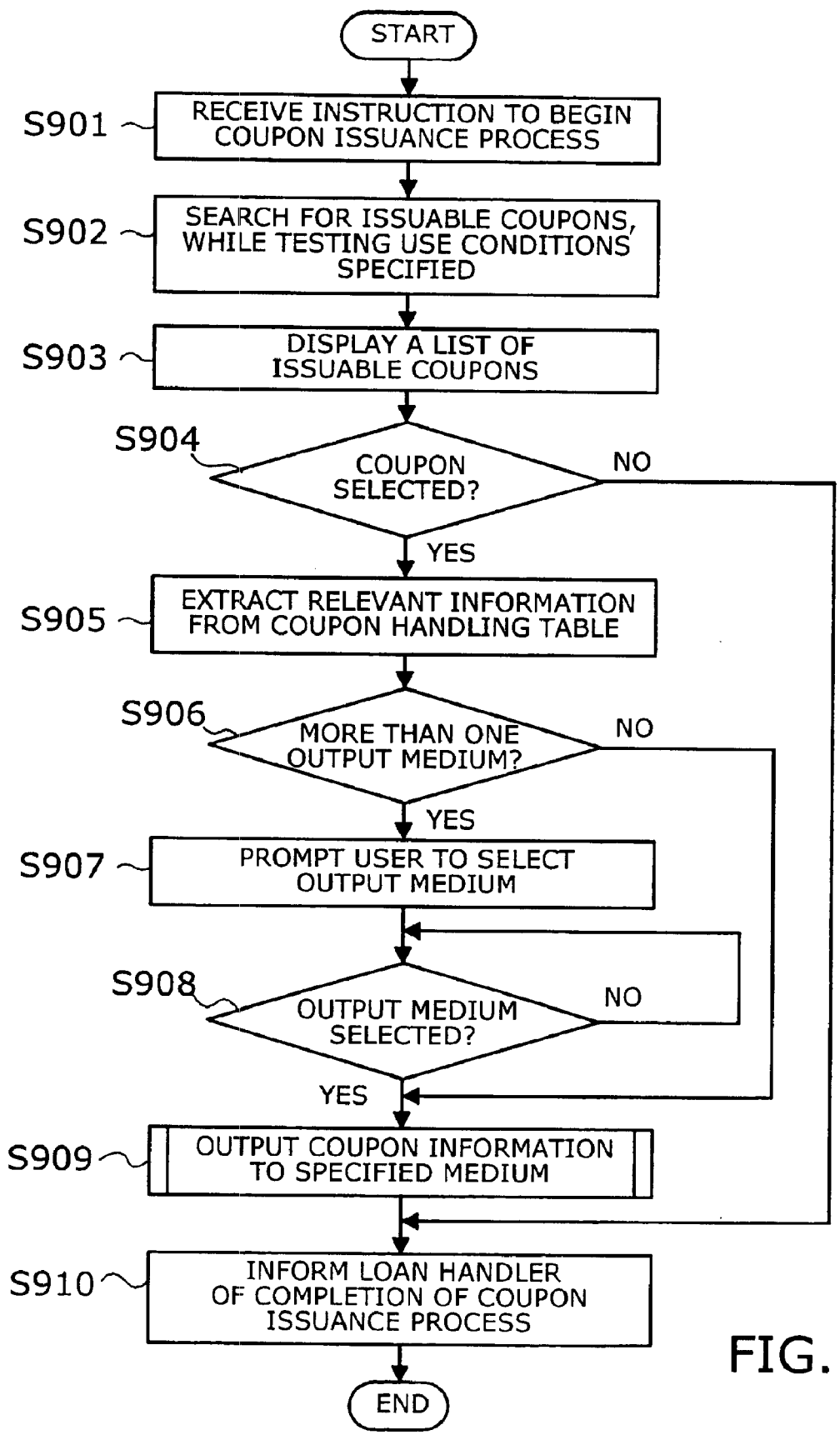
FIG. 9 is a flow chart of a coupon issuance process performed by a coupon issuance processor.

FIG. 9 is a flow chart of the coupon issuance process performed by the coupon issuance processor 112.

The process goes as follows:

In step S901, the coupon issuance processor 112 receives an instruction from the loan handler 111 to begin a process of issuing a coupon.

In step S902, the coupon issuance processor 112 searches the coupon information database 151 for available coupons which can be issued to the user. At this time the coupon issuance processor 112 refers to the coupon handling table 152 to find a use condition identifier that is associated with each coupon registered with the coupon information database 151. Based on those use condition identifiers, it determines which coupons the loan-requesting user can receive. Suppose, for example, that the coupon issuance processor 112 has found a coupon E with a use condition identifier C3 (see FIG. 5). The use condition identifier C3 requires that a given additional condition be tested at the time of issuance, and the additional condition in this case is that the amount borrowed has to be larger than or equal to 100 dollars. The coupon issuance processor 112 is allowed to issue the coupon E only when the requesting user satisfies this condition.

In step S903, the coupon issuance processor 112 extracts all issuable coupons from the coupon information database 151. It then compiles a listing of issuable coupons for display on the monitor 130. A user can select a desired coupon from among those listed on the monitor screen.

If the user selects a particular coupon by operating the input device 140 in step S904, then the coupon issuance processor 112 will proceed to step S905. If the user indicates that he/she does not wish to receive any coupons, then the coupon issuance processor 112 will proceed to step S910.

In step S905, the coupon issuance processor 112 extracts the output medium identifier, security class identifier, and use condition identifier corresponding to the selected coupon.

In step S906, if the output medium identifier suggests that the selected coupon can be made available in more than one recording medium, then the coupon issuance processor 112 will proceed to step S907. If the selected coupon allows only one recording medium, then the coupon issuance processor 112 will proceed to step S909.

In step S907, the coupon issuance processor 112 displays an output medium selection screen on the monitor 130, prompting the user to specify which recording medium he/she wish to use. If the user selects one of the proposed output media in step S908, then the coupon issuance processor 112 proceeds to step S909.

In step S909, the coupon issuance processor 112 outputs the selected coupon to the specified recording medium, and in step S910, it informs the loan handler 111 that the coupon issuance process is completed.

The following section describe a process of outputting a coupon, with reference to several example screenshots of the monitor 130. Actually, the specifics of this process and the content of display depend on which recording medium is specified as the output medium of a coupon. We will cover three different recording media one by one.

Figure 10:
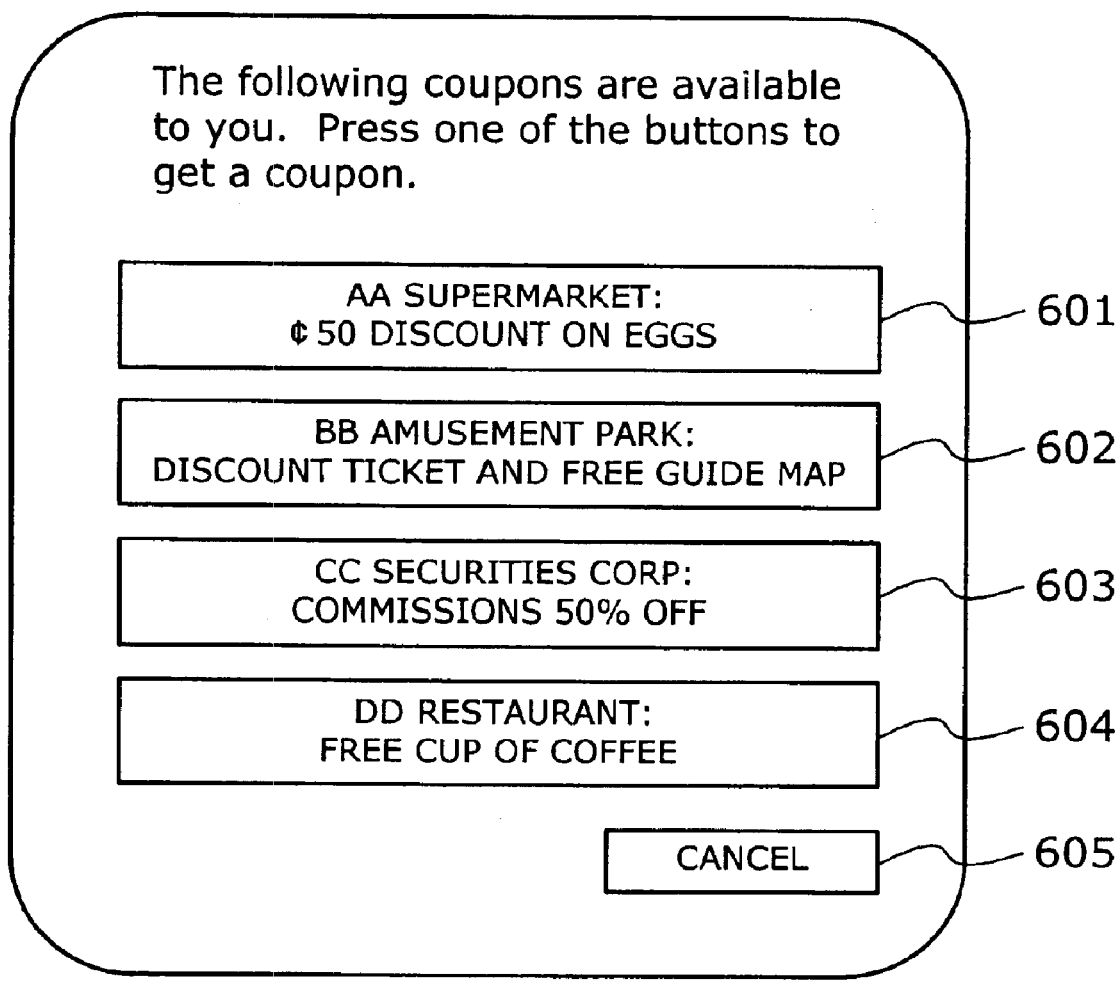
FIG. 10 shows an example screenshot on which issuable coupons are listed.

FIG. 10 shows an example screenshot on which issuable coupons are listed. This screen is compiled from the set of coupon information shown in FIGS. 4 and 5. That is, the list shows all coupons that can be issued if the amount of the requested loan is smaller than 100 dollars. This screen appears on the monitor 130 as a result of the step S903 we have described earlier in FIG. 9. While the coupon information database 151 has five entries (i.e., coupon A to coupon E), the coupon issuance processor 112 excludes the fifth coupon E from the list of issuable coupons because its use condition identifier C3 and corresponding additional condition require that the amount of loan be 1,000 dollars or more. The listing screen of FIG. 10 provides four selection buttons 601 through 604 corresponding to coupon A to coupon D, respectively. In addition, a CANCEL button 605 is used when the user does not wish any coupons.

Suppose now that the user has selected coupon A by pressing the topmost selection button 601 on the screen. Since the output medium identifier of this coupon A specifies paper only, the following process will be performed in step S909 of FIG. 9. First, the coupon descriptor of coupon A is retrieved from the coupon information database 151. The corresponding security class identifier and use condition identifier are then extracted from the coupon handling table 152. A document describing the coupon A is created from the retrieved descriptor and identifiers and passed to the print processor 190, together with an instruction to print this document. The print processor 190 thus prints out the given document on a piece of paper and issues it as a coupon.

FIG. 11 shows an example of this paper coupon. Since coupon A does not require any security check or use condition at the point of use, the paper coupon only has the name of the intended store and the description of the discount service being offered. Although it is not shown in the coupon information database 151 of FIG. 5, coupon descriptors have a data field for the expiration date of coupons. Thus the statement "Valid on Sep. 10, 2002 only" is printed as part of the coupon of FIG. 11.

Referring back to FIG. 10, suppose now that the user has selected coupon B by pressing the second selection button 602 on the screen. Recall here that the coupon B only comes in the form of coupon information written in a cellular phone.

Figure 12:
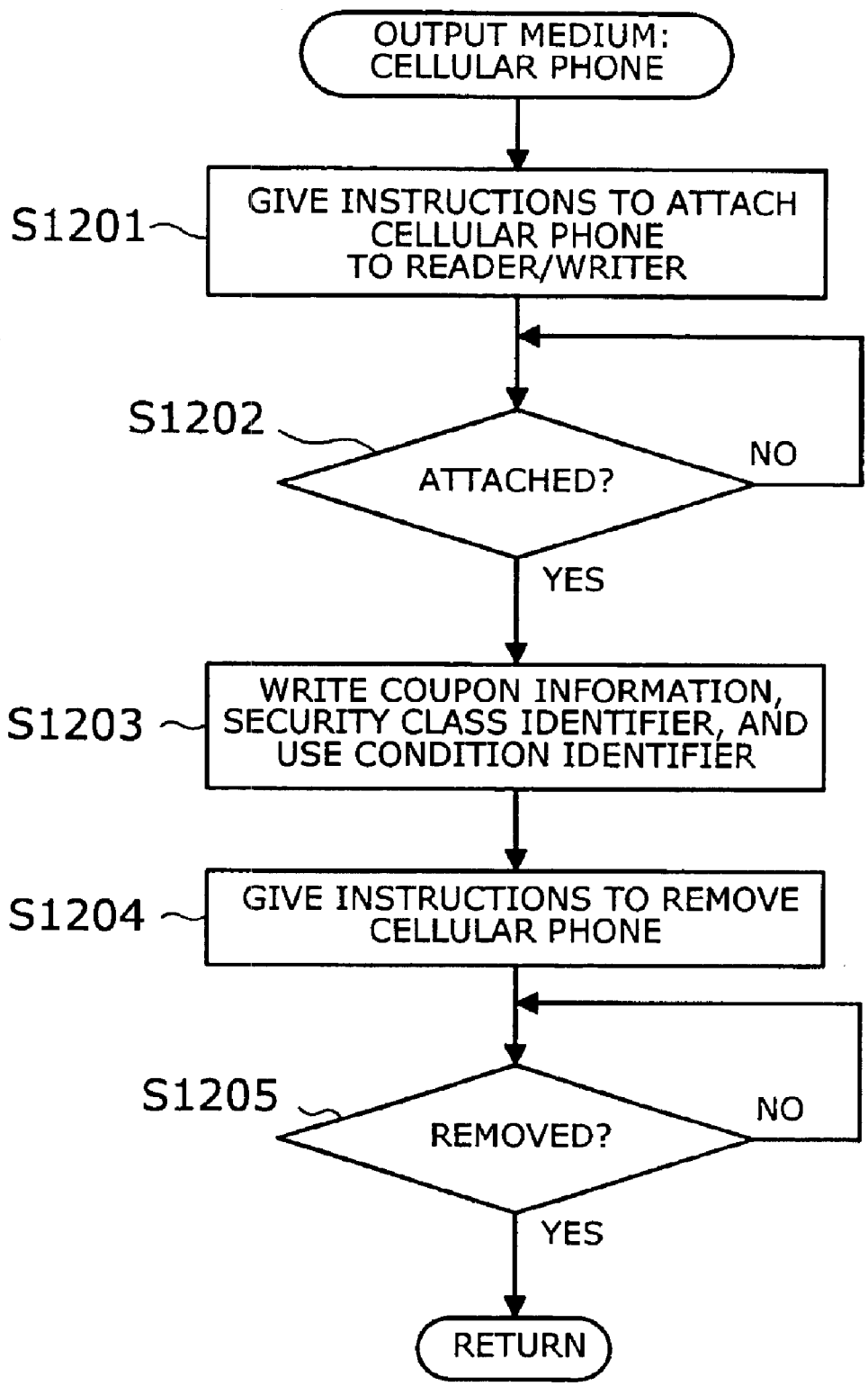
FIG. 12 is a flow chart of a process of sending a coupon to a cellular phone.

FIG. 12 is a flow chart of a process of sending a coupon to a cellular phone. This process goes as follows:

In step S1201, the coupon issuance processor 112 outputs a message to the monitor 130, requesting the user to attach his/her cellular phone to, for example, a non-contact reader/writer disposed in the cellular phone I/O processor 180. When the cellular phone is set correctly in the reader/writer, the cellular phone I/O processor 180 so notifies in step S1202, allowing the process to proceed to step S1203.

In step S1203, the coupon issuance processor 112 commands the cellular phone I/O processor 180 to write the coupon information, security class identifier, and use condition identifier of coupon B into an internal memory of the cellular phone. The cellular phone then shows the received information on its own display.

In step S1204, the coupon issuance processor 112 outputs a message to the monitor 130 that requests the user to remove his/her cellular phone from the non-contact reader/writer. When the cellular phone is removed, the cellular phone I/O processor 180 so notifies the coupon issuance processor 112 in step S1205, thus allowing the process to go back to step S910 shown in FIG. 9.

FIG. 13 shows an example screen that appears on a display of a cellular phone containing a coupon B. This screen shows a message compiled from the written coupon information, security class identifier, and use condition identifier. More specifically, the message begins with the name of the intended place of use ("BB Amusement Park," in this example), which is followed by the statement corresponding to the security class and use condition of coupon B. The statement calls for attention of the user.

Referring back to FIG. 10, suppose now that the user has selected coupon C by pressing the third selection button 603 on the screen. Recall that coupon C only comes in the form of coupon information written in an IC card.

Figure 14:
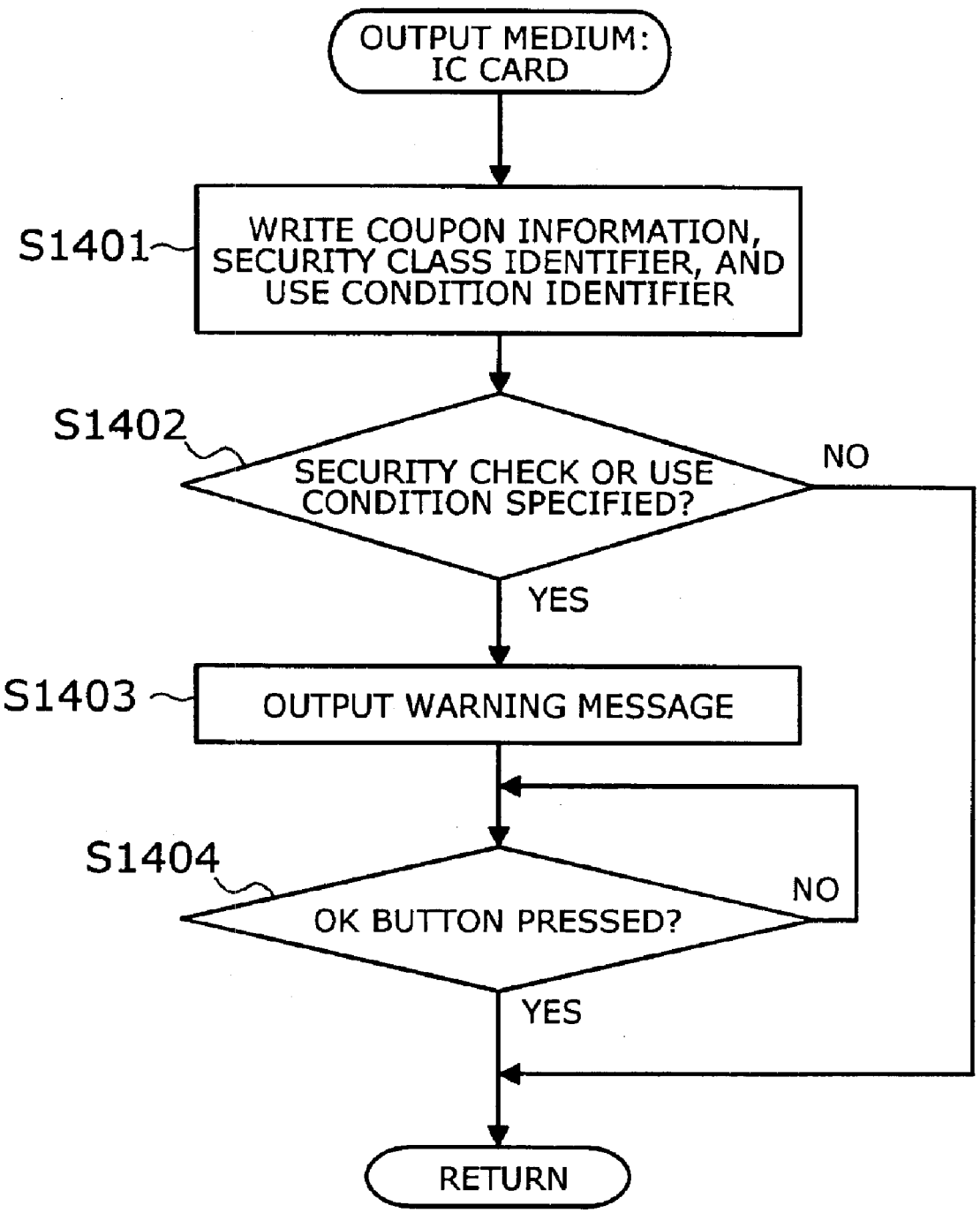
FIG. 14 is a flow chart of a process of writing a coupon in an IC card.

FIG. 14 is a flow chart showing the flow of the process of writing coupon information to an IC card. This process goes as follows:

In step S1401, the coupon issuance processor 112 commands the card I/O processor 170 to write the coupon information, security class identifier, and use condition identifier of coupon C to a storage area of a semiconductor memory embedded in the IC card. A coupon C is now in the user's IC card.

In step S1402, the coupon issuance processor 112 examines the security class identifier and use condition identifier associated with this coupon C. If there is a security check or use condition to be applied at the point of use, the subsequent steps S1403 and S1404 will be performed. More specifically, in step S1403, the coupon issuance processor 112 produces a warning message to inform the user that the coupon C is due for a security check or use condition testing at the point of use. This message appears on a screen of the monitor 130. In step S1404, it is determined whether the user has pressed OK button on the warning message screen. When a signal from the input device 140 indicates a depression of OK button, the process returns to step S910 shown in FIG. 9.

FIG. 15 gives an example of a warning message that appears on the monitor 130 when a coupon C is loaded to an IC card. This screen is produced in step S1403 shown in the flowchart of FIG. 14. With a coupon C, the user will be requested to enter a password as a security measure, if the amount paid is 100 dollars or more. In addition, the use condition of coupon C states that the payment should be made by credit card. Since IC cards have no display, it is difficult for the user to recognize such requirements or restrictions until he/she visits the store and uses the coupon. Therefore, it is preferable for the coupon issuance processor 112 to call for the user's attention by giving a warning message like the one shown in FIG. 15. When OK button 611 on this warning screen is pressed by the user, the coupon issuance process terminates itself.

Referring back to FIG. 10, suppose now that the user has selected coupon D by pressing the fourth selection button 604 on the screen. This coupon D is supposed to come in the form of an IC card or a piece of printed paper, either of which is specified by the user at the time of issuance.

Figure 16:
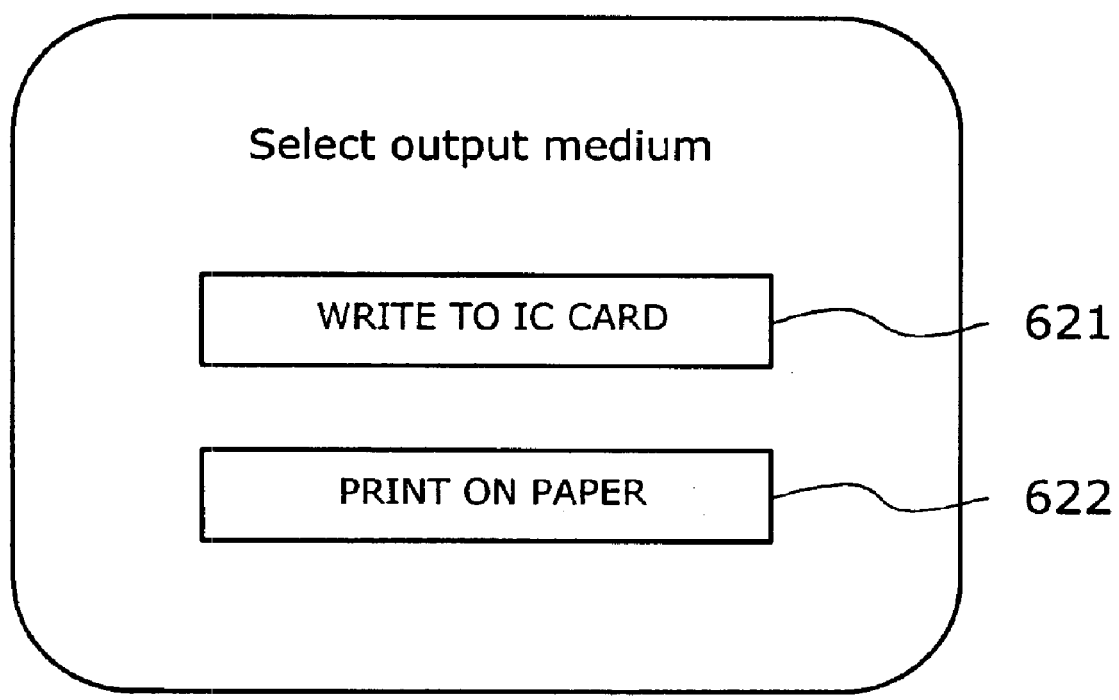
FIG. 16 shows an example of a medium selection screen that prompts a user to choose a desired recording medium.

FIG. 16 shows an example of a medium selection screen that prompts a user to choose a desired recording medium. This screen appears on a screen of the monitor 130 as a result of step S907 shown in FIG. 9. By pressing a selection button 621 or 622 on this screen, the user causes a coupon D to be output to his/her IC card or printed on a piece of paper. See earlier sections for the process after the selection of a recording medium.

Coupon information may be recorded preferentially into a user's IC card which has been inserted into the ATM 100. In this case, when sending out an output medium identifier in step S905 of FIG. 9, the coupon issuance processor 112 first determines whether IC card is specified as an output medium. If it is specified, then the process shown in FIG. 14 will be performed automatically. If it is not specified, then the coupon issuance processor 112 outputs a message to the monitor 130 to indicate that coupon information cannot be written in an IC card, and then produces a screen for the user to choose an alternative recording medium, where coupon information can be written.

Figure 17:
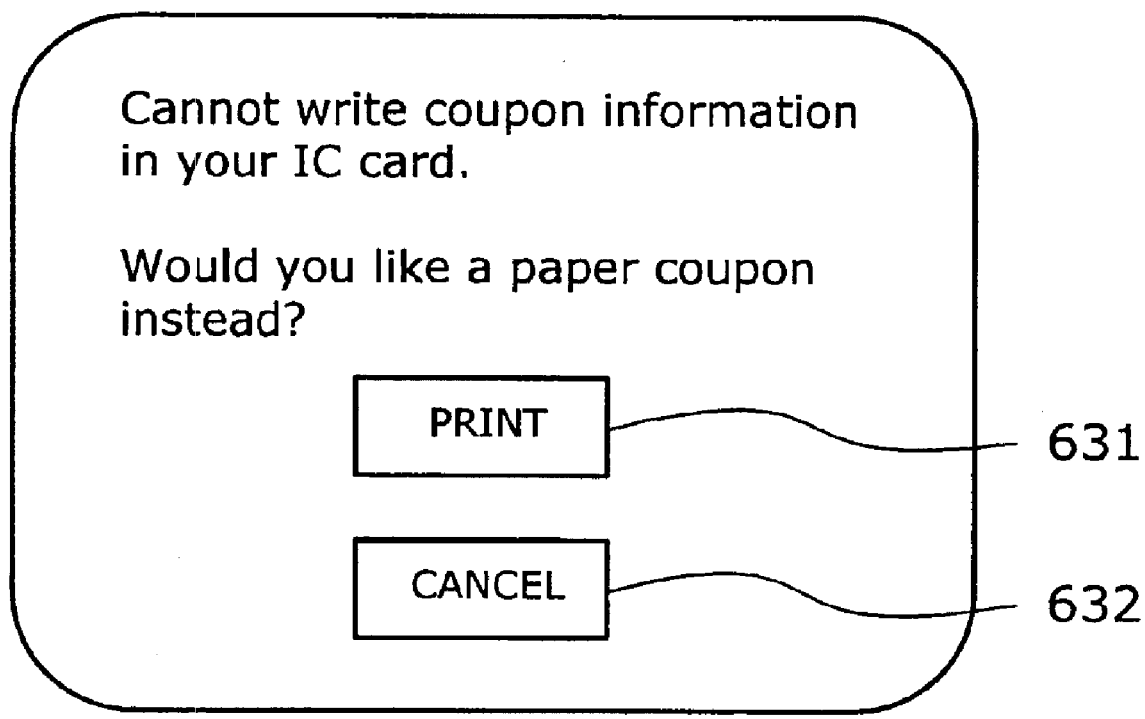
FIG. 17 shows an example of a screen displayed for selecting an alternative recording medium when coupon information cannot be written in an IC card, whereas IC cards are specified as the preferred medium.

FIG. 17 shows an example of a screen displayed for selecting a recording medium other than IC card. Assuming that the output medium identifier only specifies a paper medium, this screen informs the user that coupon information cannot be written in his/her IC card, and provides two selection buttons 631 and 632. If the first selection button 631 is pressed, then a paper coupon will be printed. If the second selection button 632 is pressed, then the present coupon issuance process is canceled. The user selects one of these options.

The issued coupons are used at stores as follows. Most paper coupons are used at stores without payment terminals, such as the store 520 shown in FIG. 2. Coupon A, for example, requires no security checks and has no particular use conditions. Therefore, the user can receive a service of the coupon only by handing it over to a salesperson to show what is printed there. If there is a statement of a use condition, the salesperson determines whether the written condition is met (for example, whether the payment was made by credit card, or whether the additional condition that requires group use is met). By doing so, the salesperson accepts or denies the use of the coupon. This type of handling is applied to such coupons that offer a relatively small amount of discount or redemption, or that only need a relatively low security level.

In the case security class identifier S2 is specified, the user must show a salesperson his/her IC card that he/she used at the time of issuance of the coupon. The salesperson visually compares the user's membership ID number on the IC card with that printed on the paper coupon, thereby determining whether to accept or refuse the coupon. This type of coupon handling is preferable in the case where the amount of discount or redemption is not small, and a relatively low security level is allowed.

For the coupons offering a large amount of discount or redemption, comparatively strict security measures will be taken. More specifically, the security class identifier S3 or S5 is specified, so that the user is requested not only to show his/her IC card, but also to enter a password to ensure the security. Or, where appropriate, the identifier S4 may be specified, which only requires a password. To apply those stringent security classes, the use of coupons may be restricted at such stores 510 where a payment terminal 511 is installed. Note that this restriction of security classes S3, S4, and S5 also applies to paper coupons.

In the case of IC card version or cellular phone version, coupons can be used only at stores 510 with a payment terminal 511, since the stored data has to be read out for the purposes of automatic security checks and automatic testing of use conditions. These types of electronic coupons can be handled in a more efficient way, compared to paper coupons.

Figure 18:
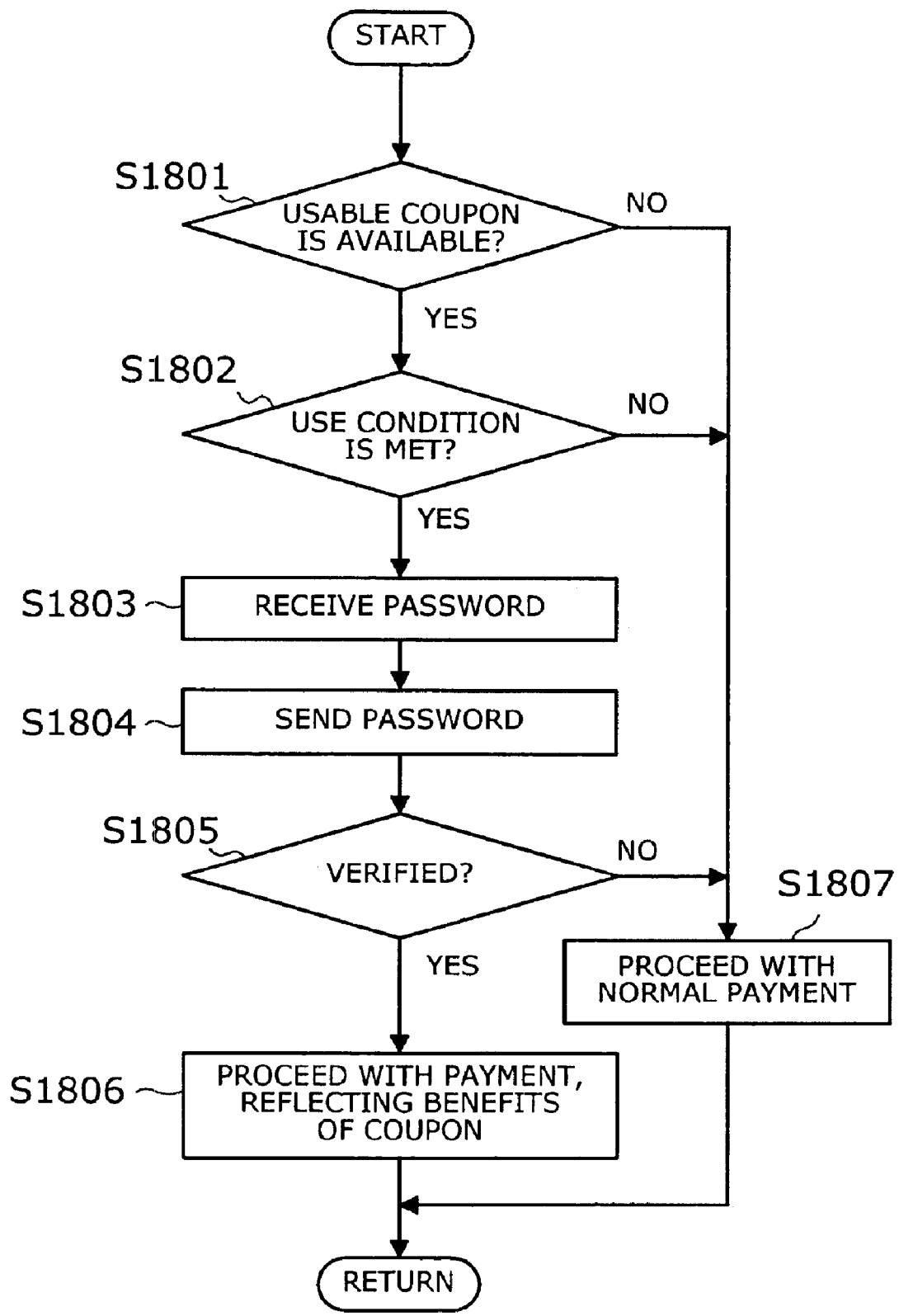
FIG. 18 is a flow chart of a process performed on a payment terminal when a coupon is used in payment at a store.

FIG. 18 is a flow chart of a process performed on the payment terminal 511 at the time of payment with a coupon. FIG. 18 shows how the benefit of coupon information stored in an IC card is reflected automatically to the price of merchandise or service when the payment is made by credit card. For example, when a user buys a product, his/her IC card (or both an IC card and a cellular phone) is set in a predetermined position on the payment terminal 511 so that the stored data stored can be read out. This is followed by some key input operations for designating the product the user wants to buy, which permits the price information to be retrieved.

After that, in step S1801 the payment terminal 511 search a storage area of a semiconductor memory in the IC card to determine whether there is any usable coupon information. At this time a memory area in the user's cellular phone is also searched, if it is attached to the payment terminal 511. In the process of step S1801, the store name or other information included in the recorded coupon information is used as a search key. If there is usable coupon information, then the process advances to step S1802. If there is no such information, then the process branches to step S1807.

In step S1802, a use condition is tested if it is specified in the coupon information found in step S1801. If the use condition applies, then the process advances to step S1803. If not, then the process goes to step S1807. Since, in this embodiment, credit card payment is assumed, the present process always takes the way to step S1803.

In step S1803, the payment terminal 511 outputs a message requesting password entry on its display and receives a password from the user. In step S1804, the entered password is sent to the server 200 in the credit card company. Users have registered in advance their passwords with the credit card company. The server 200 compares the password sent from the payment terminal 511 and the user's registered password and sends the result back to the payment terminal 511.

In step S1805, the payment terminal 511 displays the received comparison result to inform a salesperson about it. If the two passwords match with each other, then step S1806 will be performed. If the two passwords do not match, then the process goes to step S1807. In step S1806, the coupon benefits, such as a discount on purchases, are applied to the purchase price and a payment process will be performed by communicating again with the server 200. In step S1807, on the other hand, a payment process is performed without the benefits of the coupon.

As seen from the above process, usable coupon information is automatically extracted from an IC card (and a cellular phone) at the time of card payment with the payment terminal 511, and the benefits a relevant coupon is automatically reflected in the payment process. Because of such advantages, people will choose their IC cards or cellular phones as the output medium of coupons, when they receive coupons at, for example, the ATM 100. By doing so, the people can enjoy the benefits of coupons more easily, without the need for carrying many paper coupons with them. Moreover, coupon service providers can know the subsequent purchase behavior of each coupon user through the use of payment terminals 511. The obtained information is used for, for example, the marketing of their merchandise or service products.

In step S1805 shown in FIG. 18, if the two passwords do not match, it means that the coupon could have been obtained illegally. If this is the case, the process may be stopped after sending a warning message to the user.

As stated above, the present embodiment employs a coupon handling table 152 to define in advance which recording medium can be designated as the output medium of each coupon information. At the point of issuance the coupon information will be output to the right medium designated on the basis of this table 152, according to the conditions of individual stores where it will be used. Therefore, the user can reliably use issued coupons at stores. In addition, when there are two or more candidates of recording media, the user is allowed to select a desired one. This makes the coupon providing service more suitable for individual purchasers' behavior, thus satisfying them with greater convenience.

In addition to the choice of a recording medium, the present invention enables different security checks and use conditions to be applied at the point of use, depending on the intended use of each coupon. The coupon service provider can implement various considerations in coupon designs, such as what benefits to offer, or how each recording medium would be treated at stores. This feature of the present invention makes it possible to design the coupons in a more flexible manner, as well as ensuring their security.

Moreover, by using IC cards and cellular phones as the media of coupon information, all the processes from issuance of coupons to their use at stores can be performed in a more systematic and efficient way.

Furthermore, the proposed automatic transaction apparatus, such as the above-described ATM 100, is used by many users, so it will serve as an excellent advertising medium. For example, the apparatus may be designed to display an advertisement on its monitor before the user finishes a transaction and issue a coupon related to the content of that advertisement. With this system, the advertiser can distribute attractive coupons to potential customers, as a part of their promotional campaign. This will enhance the effect of advertisements.

While the above-described embodiment implements the proposed coupon issuance functions in the existing facilities of processing cash advance loans and dispensing banknotes, the present invention is not limited to that specific implementation. Rather, the proposed method of the present invention can also be applied broadly to electronic money transactions, as opposed to cash transactions. In this case, a monetary value corresponding to the amount borrowed is recorded in a semiconductor memory in an IC card through the use of an ATM, so that this monetary value can be used later for electronic fund transfer at stores. It should be mentioned here that, instead of IC cards, cellular phones may also serve as a medium for such electronic money transactions.

Payment terminals may not necessarily linked online to the server of a credit card company. The payment terminal compares the password entered by a user with the one stored in his/her IC card, instead of sending it to the remote server for user authentication.

To summarize the foregoing discussion, the present invention provides a method for issuing coupons using an automatic transaction apparatus. The proposed method allows one of a plurality of recording media to be chosen as the output medium of coupon information when issuing a coupon. To this end, output medium identifiers are stored in association with coupon descriptors. When issuing a coupon to a user, the automatic transaction apparatus refers to the corresponding output medium identifier to identify which recording medium to use, and outputs the coupon information contained in the coupon descriptor to the identified recording medium. Output medium identifiers are defined beforehand in such a way that the specified output medium will certainly be accepted at each intended store. In other words, the output medium identifiers ensure that the user can receive a benefit when he/she visits the store. This feature of the present invention permits consumers to enjoy discounts or other promotional services more conveniently and reliably.

Furthermore, according to the present invention, the automatic transaction apparatus has one or more data output units (such as the card I/O processor 170, cellular phone I/O processor 180, print processor 190 in FIG. 3) each being responsible for a particular recording medium in outputting specified coupon information. A data storage unit (i.e., data storage device 150 in FIG. 3) stores coupon descriptors and output medium identifiers in an associative manner. Output medium identifiers each specify at least one of a plurality of recording media that can be used as an output medium of coupons. Under the control of a data output controller (i.e., coupon issuance processor 112 in FIG. 3), a suitable recording medium is identified on the basis of the output medium identifier associated with the coupon descriptor that is selected. The data output controller then determines which output data unit is responsible for the identified medium, and commands that data output unit to output the coupon information to the recording medium.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method for issuing a coupon through an automatic transaction apparatus that performs a predetermined transaction interactively with a user, the method comprising:

storing coupon descriptors and output medium identifiers in an associative manner, each of the coupon descriptors containing different coupon information and each of the output medium identifiers specifying at least one of a plurality of recording media used for coupons;

storing security class identifiers in association with the coupon descriptors, each of the security class identifiers specifying security checks to be performed before the user receives a service to which the coupon entitles the user and storing use condition identifiers specifying conditions for use of coupons;

selecting one of the coupon descriptors as instructed by the user;

identifying which recording medium to use as an output medium for the selected coupon descriptor by consulting the output medium identifier associated with the selected coupon descriptor; and outputting the coupon information in the selected coupon descriptor to the identified recording medium, thereby issuing a coupon to the user; and where said outputting includes outputting the security class identifier and the use condition identifiers corresponding to the selected coupon descriptor to the recording medium with the coupon information.

2. The method according to claim 1, further comprising:

prompting the user to choose a desired recording medium from a list of selectable recording media when the output medium identifier associated with the selected coupon descriptor specifies two or more recording media, where said outputting includes outputting the coupon information to the recording medium that the user has chosen.

3. The method according to claim 1, wherein the plurality of recording media include an IC card.

4. The method according to claim 1, wherein the plurality of recording media include paper.

5. The method according to claim 1, wherein the plurality of recording media include portable information equipment.

6. The method according to claim 1, wherein the security checks include password protection that requires the user to enter a predetermined password correctly.

7. The method according to claim 1, further comprising:

inserting a transaction medium into the automatic transaction apparatus, the transaction medium containing an identifier of the user that is required to perform the predetermined transaction with the user;

determining, based on the output medium identifier associated with the selected coupon descriptor, whether the transaction medium is specified as an output medium for the coupon information; and notifying the user that the coupon information cannot be output to the inserted transaction medium upon determining that the transaction medium is not specified as an output medium for the coupon information.

8. The method according to claim 1, wherein the coupon descriptors and output medium identifiers are delivered from a host computer connected to the automatic transaction apparatus via a network.

9. The method according to claim 1, wherein the coupon descriptors and output medium identifiers are loaded from a portable digital data storage medium.

10. An automatic transaction apparatus that performs a predetermined transaction interactively with a user, the apparatus comprising:

a data storage unit that stores coupon descriptors and output medium identifiers in an associative manner, each of the coupon descriptors containing different coupon information and each of the output medium identifiers specifying at least one of a plurality of recording media used for coupons, storing security class identifiers in association with the coupon descriptors, each of the security class identifiers specifying security checks to be performed before the user can receive a service to which the coupon entitles the user and storing use condition identifiers specifying conditions for use of coupons;

one or more data output units each being responsible for a particular recording medium in outputting specified coupon information thereto for use by the user; and an output control unit that identifies which recording medium to use as an output medium by consulting the output medium identifier associated with one of the coupon descriptors that is selected, determines which output data unit is responsible for the identified recording medium, and commands the determined data output unit to output the coupon information of the selected coupon descriptor and the security class identifier and the use condition identifiers corresponding to the selected coupon descriptor to the recording medium.

11. The automatic transaction apparatus according to claim 10, further comprising:

an output medium listing unit that provides the user with a list of recording media that can be used as the output medium for the coupon information; and an output medium selection unit that receives a selection that the user makes when the list of recording media is provided by said output medium listing unit; and where the output medium identifier associated with the selected coupon descriptor specifies two or more recording media, and said output control unit commands said output medium listing unit to provide the user with a list of the specified recording media, determines which data output unit is responsible for the recording medium selected by the user, and commands the determined data output unit to output the coupon information of the selected coupon descriptor.

12. The automatic transaction apparatus according to claim 10, wherein:

said data storage unit further stores security class identifiers in association with the coupon descriptors, the security class identifiers each specifying what security checks should be performed before the user can receive a service to which the coupon entitles the user; and said output control unit extracts from the data storage unit one of the security class identifiers that is associated with the selected coupon descriptor, and commands the determined data output unit to output the extracted security class identifier together with the coupon information.

13. A program product that performs a predetermined transaction interactively with a user, the program product causing a computer system to perform an operation, comprising:

storing coupon descriptors and output medium identifiers in an associative manner, each of the coupon descriptors containing different coupon information and each of the output medium identifiers specifying at least one of a plurality of recording media used for coupons;

storing security class identifiers in association with the coupon descriptors, each of the security class identifiers specifying security checks to be performed before the user receives a service to which the coupon entitles the user and storing use condition identifiers specifying conditions for use of coupons;

selecting one of the coupon descriptors as instructed by the user;

identifying which recording medium to use as an output medium for the selected coupon descriptor, by consulting the output medium identifier associated with the selected coupon descriptor; and outputting the coupon information in the selected coupon descriptor to the identified recording medium, thereby issuing a coupon to the user; and where said outputting includes outputting the security class identifier and the use condition identifiers corresponding to the selected coupon descriptor to the recording medium with the coupon information.

14. A method of issuing a coupon via an automatic transaction apparatus, comprising:

storing descriptive information of the coupon including output medium identifiers specifying at least one type of recording medium for outputting the coupons, security class identifiers indicating a security measure to be executed when issuing the coupons and use condition identifiers for indicating corresponding use conditions of the coupons;

displaying available coupons to the user upon receipt of a coupon issuance request from a user; and issuing the coupon to the user based on the user's selection from the available coupons, where the issuing includes indicating the at least one type of recording medium for outputting the coupon, indicating the corresponding use conditions of the coupon and identifying the security measure to be executed upon issuance of the coupon based on the information describing the coupon.

* * * * *